United States Patent
Ji et al.

(10) Patent No.: US 9,819,457 B2
(45) Date of Patent: Nov. 14, 2017

(54) DEVICE AND METHOD FOR ADAPTIVE CHANNEL ESTIMATION

(71) Applicant: APPLE INC., Cupertino, CA (US)

(72) Inventors: Zu Ji, San Jose, CA (US); Johnson O. Sebeni, Fremont, CA (US); Yu-Lin Wang, Fremont, CA (US)

(73) Assignee: APPLE INC., Cupertino, CA (US)

( * ) Notice: Subject to any disclaimer, the term of this patent is extended or adjusted under 35 U.S.C. 154(b) by 69 days.

(21) Appl. No.: 14/846,002

(22) Filed: Sep. 4, 2015

(65) Prior Publication Data

US 2016/0286535 A1  Sep. 29, 2016

Related U.S. Application Data

(60) Provisional application No. 62/138,820, filed on Mar. 26, 2015.

(51) Int. Cl.
| | |
|---|---|
| *H04Q 7/00* | (2006.01) |
| *H04L 5/00* | (2006.01) |
| *H04B 17/309* | (2015.01) |

(52) U.S. Cl.
CPC ......... *H04L 5/0007* (2013.01); *H04B 17/309* (2015.01); *H04L 5/0048* (2013.01); *H04L 5/0053* (2013.01)

(58) Field of Classification Search
CPC ... H04L 5/0007; H04L 5/0053; H04L 5/0048; H04B 17/309; Y02B 60/50
USPC .......................... 370/329, 330, 252, 254, 328
See application file for complete search history.

(56) References Cited

U.S. PATENT DOCUMENTS

| | | | | |
|---|---|---|---|---|
| 2010/0215011 | A1* | 8/2010 | Pan ...................... | H04L 5/0064 370/329 |
| 2014/0269395 | A1* | 9/2014 | Chen ..................... | H04B 7/024 370/252 |
| 2015/0215916 | A1* | 7/2015 | Chen .................... | H04J 11/0033 370/329 |
| 2015/0349979 | A1* | 12/2015 | Ji ........................ | H04L 25/0224 370/312 |
| 2016/0014625 | A1* | 1/2016 | Devarasetty .......... | H04W 24/06 370/252 |
| 2016/0173249 | A1* | 6/2016 | Kwon ................... | H04L 5/0048 370/329 |
| 2016/0242231 | A1* | 8/2016 | Vajapeyam ......... | H04W 76/048 |

* cited by examiner

*Primary Examiner* — Chuong T Ho
(74) *Attorney, Agent, or Firm* — Fay Kaplun & Marcin, LLP (57) ABSTRACT

A user equipment and method performs an adaptive channel estimation. The method performed at a user equipment includes receiving physical downlink control channel (PDCCH) information for a subframe from a network, the subframe including reference symbols at predetermined times therein. If the PDCCH information does not include a downlink grant for the user equipment, a measured value of a network metric experienced by the user equipment is determined and compared to a threshold criteria. A first set of the reference symbols is used for channel estimation when the threshold value is satisfied and a second set of the reference symbols is used for channel estimation when the threshold is not satisfied, the first set of references symbols is a subset of the second set of the reference symbols. In another embodiment, a previously determined channel estimation at a previous subframe is used for the subframe when the threshold is satisfied.

20 Claims, 5 Drawing Sheets

DEVICE AND METHOD FOR ADAPTIVE CHANNEL ESTIMATION

PRIORITY CLAIM/INCORPORATION BY REFERENCE

This application claims priority to U.S. Provisional Application 62/138,820 entitled "Device and Method for Adaptive Channel Estimation," filed on Mar. 26, 2015, the entirety of which is incorporated herein by reference.

BACKGROUND INFORMATION

A user equipment (UE) may establish a connection to a wireless communications network via a base station (e.g., an eNodeB (eNB) in Long Term Evolution (LTE) networks). To properly be prepared for demodulating transmitted signals (i.e., received signals), the UE must be configured with proper settings. Specifically, properties related to the physical layer of the transceiver used to connect to the network must be known. For example, the channel (e.g., band of frequencies) must be known for the incoming signal in order for it to be properly received. While connected to the network, reference symbols are transmitted from a base station of the network to the UE. The reference symbols may be used as a basis for calculating a variety of wireless properties, in particular, for channel estimation.

Channel estimation may be derived based upon the reference symbols in both a frequency domain and a time domain for demodulating the received downlink data symbols. Channel estimation benefits from increased information to more fully define the estimate. That is, when more reference symbols in the frequency and time domain are used, the channel estimation may be improved in frequency selection and time-varying wireless channels, respectively. Channel estimates from individual reference symbol resource elements may be inputs to properly designed filters to derive the channel estimation for data symbols as well as averaging down the impact of noise.

Although the increased use of reference symbols provides improved channel estimation, those skilled in the art will understand that increased processing and receiving of these reference symbols require increased power consumption. For example, when further reference symbols are used, the receiver is required to be activated to receive these further reference symbols. In another example, when further reference symbols are received, the processor is required to perform operations on these further reference symbols. Thus, the benefits of improved channel estimation are balanced against increased power consumption.

SUMMARY

In an exemplary embodiment, a user equipment performs a method including receiving physical downlink control channel (PDCCH) information from a network, the PDCCH information being for a subframe including reference symbols at predetermined times therein and when the PDCCH information does not include a downlink grant for the user equipment in the subframe, the method further includes determining a measured value of a network metric experienced by the user equipment and determining whether a threshold criteria is satisfied by the measured value relative to a threshold value of the network metric. When the measured value satisfies the threshold value, a first set of the reference symbols is utilized for channel estimation. When the measured value does not satisfy the threshold value, a second set of reference symbols is utilized for the channel estimation, wherein the first set of references symbols is a subset of the second set of the reference symbols.

In a further exemplary embodiment, a user equipment has a transceiver configured to establish a connection to an access network and a processor. The processor and transceiver are configured to perform a channel estimation by receiving physical downlink control channel (PDCCH) information from a network, the PDCCH information being for a subframe including reference symbols at predetermined times therein, determining that the PDCCH information does not include a downlink grant for the user equipment in the subframe, determining a measured value of a network metric experienced by the user equipment, determining whether a threshold criteria is satisfied by the measured value relative to a threshold value of the network metric and utilizing a first set of the reference symbols for channel estimation when the measured value satisfies the threshold value which is a subset of a second set of the reference symbols used for channel estimation when the measured value does not satisfy the threshold value.

In another exemplary embodiment a user equipment performs a method including receiving physical downlink control channel (PDCCH) information from a network, the PDCCH information being for a subframe including reference symbols at predetermined times therein and when the PDCCH information does not include a downlink grant for the user equipment in the subframe, the method further includes determining a measured value of a network metric experienced by the user equipment, determining whether a threshold criteria is satisfied by the measured value relative to a threshold value of the network metric and utilizing a previously determined channel estimation at a previous subframe relative to the subframe for the subframe when the measured value satisfies the threshold value.

In a further exemplary embodiment, a user equipment has a transceiver configured to establish a connection to an access network and a processor. The processor and transceiver are configured to perform a channel estimation by receiving physical downlink control channel (PDCCH) information from a network, the PDCCH information being for a subframe including reference symbols at predetermined times therein, determining that the PDCCH information does not include a downlink grant for the user equipment in the subframe, determining a measured value of a network metric experienced by the user equipment, determining whether a threshold criteria is satisfied by the measured value relative to a threshold value of the network metric and utilizing a previously determined channel estimation at a previous subframe relative to the subframe for the subframe when the measured value satisfies the threshold value.

DETAILED DESCRIPTION

The exemplary embodiments may be further understood with reference to the following description and the related appended drawings, wherein like elements are provided with the same reference numerals. The exemplary embodiments are related to a device and method for an adaptive channel estimation scheme. The adaptive channel estimation scheme may relate particularly to a power management operation for user equipment (UE) connected to Long Term Evolution (LTE) networks. Furthermore, the adaptive channel estimation scheme may be performed during a Physical Downlink Control Channel (PDCCH) only scenario where downlink grants are not included. According to a first mechanism, the adaptive channel estimation may utilize different sets of reference symbols to be used in the channel estimation. According to a second mechanism, the adaptive channel estimation may utilize a previously determined channel estimation. In this manner, the exemplary embodiments may also adaptively manage power consumption when at least one predetermined criteria is met to use these mechanisms.

Initially, the exemplary embodiments are described with regard to the LTE network and several features thereof. Specifically, the LTE network may utilize a connected discontinuous reception (CDRX) functionality in which a schedule of transmissions is used at known times. The CDRX functionality may entail the use of a plurality of frames that occupy a predetermined time (e.g., 20 ms, 40 ms, etc.) where the frame comprises a plurality of subframes that occupy a predetermined time (e.g., 1 ms). However, it is noted that the use of the LTE network is only exemplary and other network types and features thereof may be used with the exemplary embodiments, particularly when transmissions are scheduled.

Figure 1:
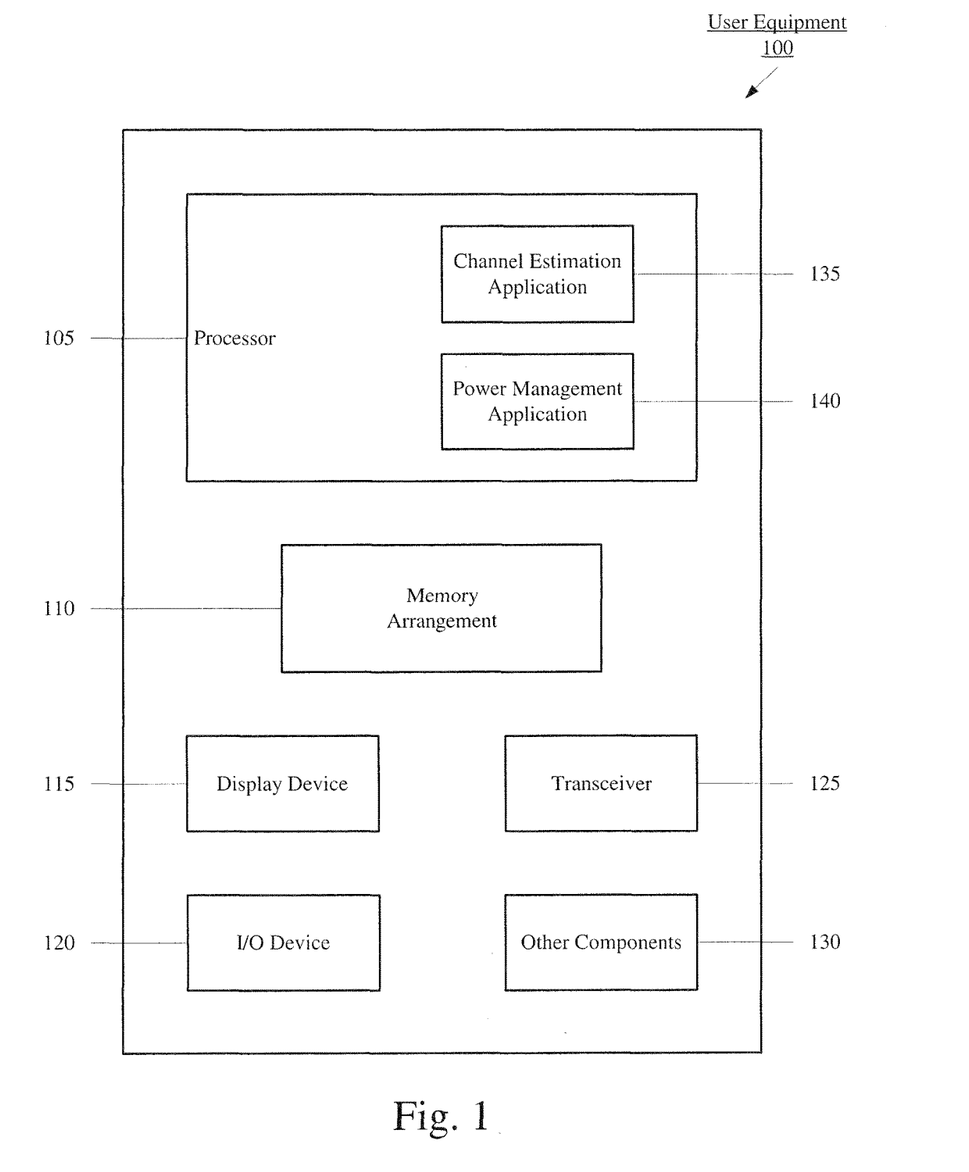
FIG. 1 shows components of an exemplary user equipment configured to perform an adaptive channel estimation, according to some embodiments.

FIG. 1 shows components of an exemplary UE 100 configured to perform adaptive channel estimation. The UE 100 may represent any electronic device configured to join a LTE network and exchange data therewith. Specifically, the data exchanged with the LTE network may be control information such as downlink grants, uplink grants, etc. Furthermore, the connection with the LTE network may enable particular scheduling for the control information to be transmitted between the UE 100 and the LTE network. However, it should be noted that the use of the LTE network is only exemplary and the exemplary embodiments may be adapted to any network connection with the UE 100.

The UE 100 may represent any electronic device such as a portable device (e.g., a cellular phone, a smartphone, a tablet, a phablet, a laptop, a wearable, etc.) or a stationary device (e.g., desktop computer). Furthermore, the exemplary operation of the UE 100 may relate to a situation when power management operation is useful. For example, the UE 100 may include a portable power supply that is limited such that conservation of power consumption enables a longer use of the UE 100. The UE 100 may include a processor 105, a memory arrangement 110, a display device 115, an input/output (I/O) device 120, a transceiver 125, and other components 130 such as the portable power supply, an audio I/O device, a data acquisition device, ports to electrically connect the UE 100 to other electronic devices, etc.

The processor 105 may be configured to execute a plurality of applications of the UE 100. For example, the applications may include a web browser when connected to the LTE network via the transceiver 125. Other functionalities may include short messaging service (SMS) messages, email, voice and/or video data related to communications, etc. Thus, data may be exchanged properly when network parameters are determined such as the channel in which the data is transmitted from the LTE network and received by the UE 100. Specifically, uplink and downlink grants may be properly determined when these types of applications are executed. As such and in another example, the applications may include a channel estimation application 135. The channel estimation application 135 may perform the channel estimation based upon reference symbols that are received by the UE 100. In a further example, the applications may include a power management application 140. The power management application 140 may perform the adaptive channel estimation mechanisms of the exemplary embodiments that provide either a set of reference symbols to be used by the channel estimation application 135 or a previously determined channel estimation value, as will be described in further detail below.

It should be noted that the applications executed by the processor 105 are only exemplary. In a first example, the processor 105 may be an applications processor or a baseband processor. In another example, the functionality described for the applications may also be represented as a separate incorporated component of the UE 100 (e.g., an integrated circuit with or without firmware) or may be a modular component coupled to the UE 100. The functionality may also be distributed throughout multiple components of the UE 100.

The memory arrangement 110 may be a hardware component configured to store data related to operations performed by the UE 100. For example, the memory arrangement 110 may store previously determined channel estimation values along with a subframe in which the value had been calculated. In another example, the memory arrangement 110 may store the control information being received by the UE 100. The display device 115 may be a hardware component configured to show data to a user while I/O device 120 may be a hardware component configured to receive inputs from the user and output corresponding data. The transceiver 125 may enable the connection between the UE 100 and the LTE network. Accordingly, the transceiver 125 may operate on a frequency corresponding to the LTE network. However, as discussed above, the LTE network is only exemplary and the transceiver 125 may operate on different or further frequencies and channels. The transceiver 125 may also include other components such as an antenna or an antenna array.

Figure 2:
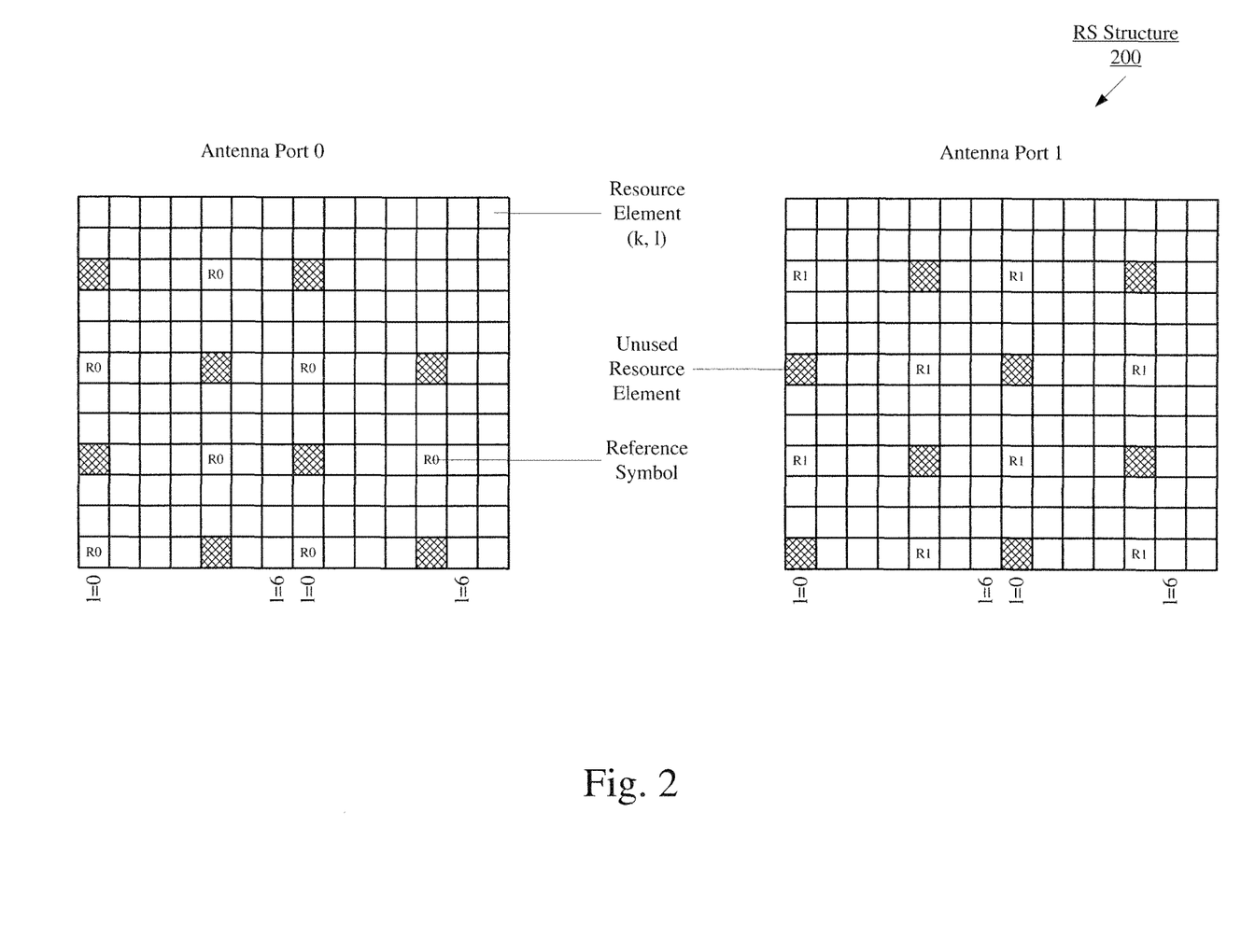
FIG. 2 shows an exemplary reference symbol structure, according to some embodiments.

The exemplary embodiments are configured to perform a channel estimation determination based upon a number of predetermined reference symbols. Under various specifications particularly regarding LTE networks, the reference symbols may be received by the UE 100 at known times along with other control information. FIG. 2 shows an exemplary reference symbol structure 200 that illustrates a manner in which reference symbols are inserted into a frame or subframe.

The reference symbol structure 200 is illustrated in FIG. 2 as including two antennas. Specifically, a first antenna may be associated with an antenna port 0 while a second antenna may be associated with an antenna port 1. The reference symbol structure 200 illustrates a first structure for the antenna port 0 and a second structure for the antenna port 1. These structures may indicate when a reference symbol is scheduled to be received within the duration of the subframe and the designated frequency at which the reference symbol is to be received at each antenna. Accordingly, the structure associated with the antenna port 0 utilizes reference symbols denoted as R0 while the structure associated with the antenna port 1 utilizes reference symbols denoted as R1.

Each structure may be divided into two slots, each slot including seven orthogonal frequency-division multiplexing (OFDM) symbols. That is, each slot has a frequency domain spacing of seven OFDM symbols relative to time. As illustrated, the reference symbols for the reference symbol structure 200 may be received within a plurality of predetermined OFDM symbols. Specifically, reference symbols are inserted within the first (1=0) and fifth (1=4) OFDM symbols relative to time at known frequencies in the structure for the first slot of the antenna port 0. The same is also used for the second slot of the structure of the antenna port 0. The structure for the first and second slots of the antenna port 1 also have reference symbols inserted within the first (1=0) and fifth (1=4) OFDM symbols relative to time at known frequencies.

Furthermore, since a second antenna is also present, the structure for the antenna port 0 has frequencies in the select OFDM symbols that are blocked out, as does the structure for the antenna port 1. Specifically, the OFDM symbol at a select frequency corresponding to the OFDM symbol for a reference symbol at the select frequency in the other structure is blocked out. That is, if a reference symbol is inserted for structure of the antenna port 0, the corresponding OFDM symbol in the structure of the antenna port 1 is blocked out and vice versa. Accordingly, the reference symbol structure 200 shows the use of unused resource elements.

It should be noted that the times in which the reference symbols are received as illustrated in FIG. 2 is only exemplary. Those skilled in the art will understand that FIG. 2 may relate to one example of a cyclic prefix (CP) subframe structure. In the example of FIG. 2, the reference symbols are inserted in OFDM symbols 0, 4, 7, 11. However, different timing of reference symbols may also be used according to the exemplary embodiments. For example, an extended CP subframe structure may include the reference symbols in OFDM symbols 0, 3, 6, 9. Accordingly, the functionalities described herein of the exemplary embodiments may be used with any scheduling of reference symbols.

The above reference symbol structure 200 illustrates how reference symbols may be inserted within the subframe at known times. Control information may also be included in a subframe such as the downlink grant. As the downlink grant relates to use of the receiver, the downlink grant has a direct correlation to power consumption and preservation when considering receiving of reference symbols. For example, when there is a downlink grant, the receiver is activated whether or not further reference symbols are to be received. In another example, when there is no downlink grant and no further reference symbols are to be received, the receiver may be deactivated to increase power conservation.

A downlink grant may be determined when a downlink grant is included in a PDCCH. The PDCCH is a downlink control channel that carries the downlink grants within the same subframe. A downlink grant in a PDCCH may be present in the first three symbols of the subframe for a system bandwidth greater than 1.4 MHz or in the first four symbols of the subframe for a system bandwidth at 1.4 MHz. Those skilled in the art will understand that the PDCCH is blind-decoded in both a common space and a UE search space for possible downlink grants. That is, the UE 100 is unaware of whether there will be a downlink grant and therefore must search the entirety of this space to verify that there is no downlink grant. It is also noted that a higher PDCCH aggregation level indicates more coding gain on PDCCH and lower code rates.

Because there may or may not be a downlink grant in the PDCCH, there may be PDCCH-only scenarios. One example of a PDCCH-only scenario relates to when there are sporadic Physical Downlink Shared Channel (PDSCH) allocations. Thus, for most downlink subframes, the UE 100 only needs to do a PDCCH decoding procedure to identify grants and does not need to do a PDSCH decoding if no PDCCH grant is detected for the current subframe. In other words, although the PDSCH may not require any decoding, the UE 100 is still required to decode the PDCCH.

The above-described exemplary PDCCH-only scenario has a direct impact on power consumption. For data services (particularly lightweight ones such as web browsing, email, SMS, etc.), the UE 100 only has PDSCH allocations for a fraction of its downlink receptions. Therefore, the UE 100 is unnecessarily consuming power for the subframes with no PDSCH allocation. Once the UE 100 finishes the POOCH decoding and no downlink grant is detected, the UE 100 is not required to monitor or process the rest of the downlink subframes. Those skilled in the art will also appreciate that reliable PDCCH decoding requires reliable downlink channel estimation that is based on the received downlink reference symbols. Accordingly, these features of the PDCCH-only scenario correspond to the balancing between improved channel estimation, reference symbol receiving and use, and power consumption.

There are several known approaches to decoding the PDCCH to detect any downlink grants for the current subframe. In one approach and as discussed above, the PDCCH needs to be blind-decoded by searching through common and UE specific PDCCH search spaces. However, misdetections of genuine PDCCHs lead to missing PDSCHs as well as unnecessary retransmissions of PDSCH as well as causing a scheduling burden on the PDCCHs. Such a condition may cause a negative data experience for the user of the UE 100 and also increases network loading due to retransmissions, which affects the network itself.

To ensure reliable PDCCH decoding, another approach considers continuous reference symbols for channel estimation or at least the reference symbols in the PDCCH region. For example, OFDM symbol 0 and OFDM symbol 4 for normal reference symbol structures are used in channel estimation where the PDCCH region spans from OFDM symbol 0 to OFDM symbol 3. Considering the firmware and hardware processing after capturing the reference symbols of interest, by the time the PDCCH decoding results are available, it is likely beyond a point in the subframe or even completely after the subframe. Thus, there is either no time for PDCCH-only operations such as deactivating the receiver paths for power saving or limited time that does not provide any meaningful power conservation. Furthermore, deactivating the receiver paths and processing units such as the receiver front end, firmware, and/or hardware may require time, which further decreases any margin for power conservation.

It is also noted and will become apparent later that the PDCCH is usually better protected in terms of coding gain compared with PDSCH per the LTE Specifications (e.g., convolutional coded) given the importance of the grant scheduling. Accordingly, network parameters such as a signal to noise ratio (SNR) requirement for reliable detection of PDCCHs is much lower compared to PDSCH especially in low to mid mobility regions.

Figure 3:
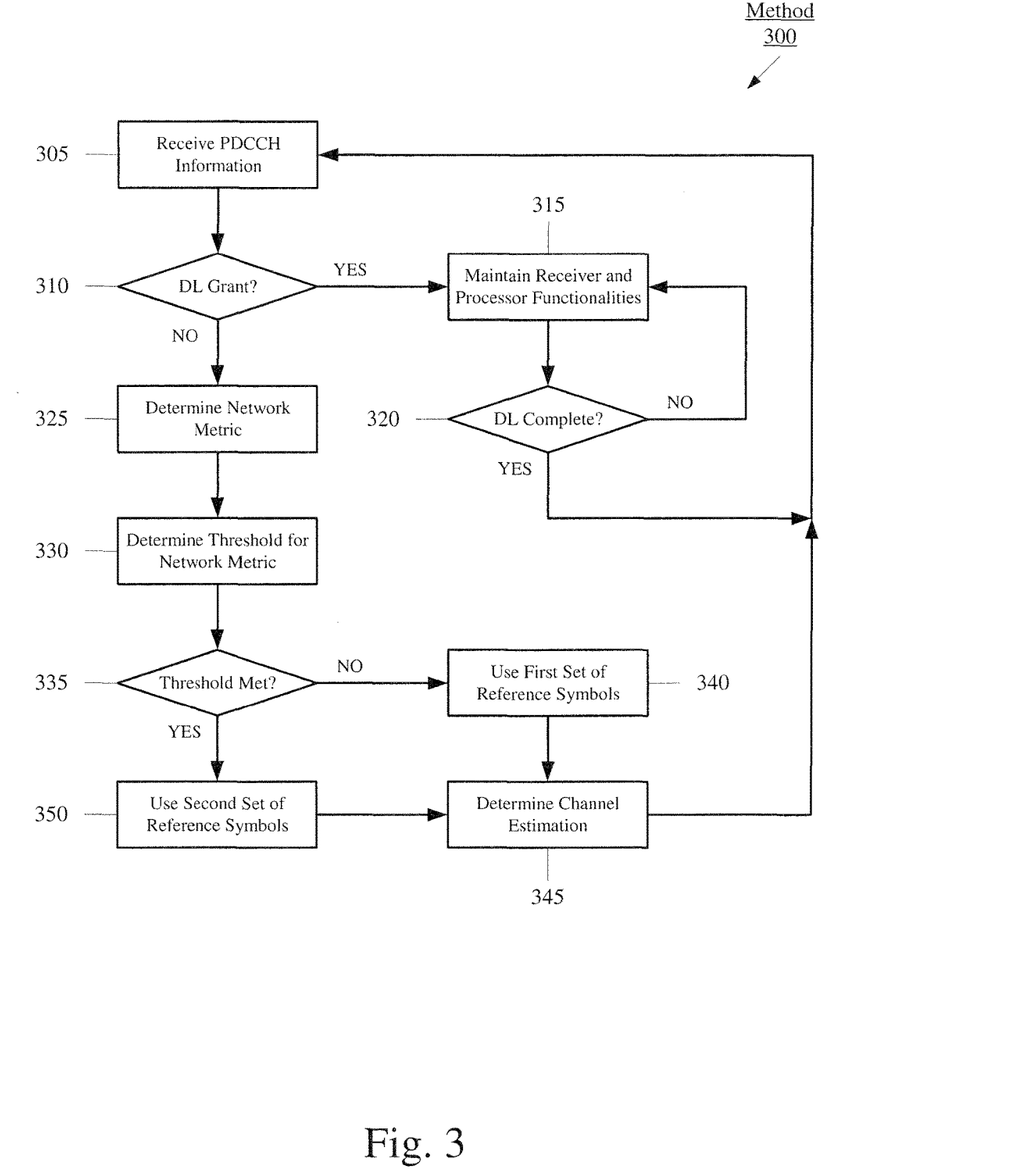
FIG. 3 shows a first exemplary method of an adaptive channel estimation scheme, according to some embodiments.

In view of the approaches described above, the exemplary embodiments provide various mechanisms to improve power conservation. In a first mechanism, the exemplary embodiments utilize different sets of reference symbols to be used in channel estimation calculations. FIG. 3 shows an exemplary method 300 of an adaptive channel estimation scheme using this first mechanism. It is noted that, unless otherwise indicated, the method 300 may be performed through execution of the power management application 140.

In 305, the UE 100 receives the PDCCH information. The PDCCH information may indicate whether there are any downlink grants. Thus, in 310, the UE 100 determines whether a downlink grant is included in the PDCCH information for a current subframe. If the UE 100 detects a downlink grant in the PDCCH information, the UE 100 continues the method 300 to 315. In 315, the UE 100 maintains the receiver and processor functionalities so that the data may be properly received based upon standard channel estimation determinations. In 320, the UE 100 determines whether the downlink has been completed. If the downlink is still incomplete, the UE 100 returns the method 300 to 315. However, if the downlink is complete, the UE 100 returns the method 300 to 305.

Returning to 310, if there is no downlink grant detected in the PDCCH information, the UE 100 continues the method 300 to 325. In 325, the UE 100 determines a network metric. Specifically, the UE 100 may determine a measured value of the network metric. The exemplary embodiments may be configured to utilize a variety of different network metrics. In a first example, the network metric used may be a SNR value. Specifically, the SNR value may be estimated for the reference symbols being received. In a second example, the network metric used may be a Doppler estimation. Specifically, the Doppler estimation may also be obtained from the reference symbols that determine a time-varying characteristic of the wireless channel. Further examples of the network metric being used may include a PDSCH decoding error and/or a PDSCH block error rate (BLER) of prior downlink processes when a downlink grant was detected (e.g., downlink BLER statistics), a received signal strength indication (RSSI) of signals including the reference symbols, a reference signal received power (RSRP) of the reference symbols, etc. Those skilled in the art will understand that any mechanism may be used in measuring the value of these network metrics.

In 330, the UE 100 determines a threshold value associated with the network metric type. That is, each of the network metrics may have a corresponding threshold to which the measured value is compared against to determine whether the network metric satisfies a predetermined criteria. For example, if the network metric is the SNR value, a threshold of between 5 and 10 dB may be used. However, those skilled in the art will understand that this may depend on a variety of factors such as a receiver capability. In another example, if the network metric is the Doppler estimation, a threshold of about 70 Hz may be used. These threshold values may be stored and preprogrammed for use in the memory arrangement 110.

In 335, the UE 100 determines whether the threshold is met. Due to the nature of the different threshold values, the threshold criteria may be met by the measured network metric being greater or less than the corresponding threshold value. For example, the network metric being the SNR may meet the threshold criteria when the measured SNR value is greater than the corresponding threshold value. In another example, the network metric being the Doppler estimation may meet the threshold criteria when the measured Doppler estimation is lower than the corresponding threshold value. In a further example, the network metric being the PDSCH BLER may meet the threshold criteria when the measured PDSCH BLER is lower than the corresponding threshold value.

It should be noted that the threshold values for the different network metrics may be obtained empirically and may be different for different PDCCH aggregation levels. It should also be noted that the UE 100 may be configured to utilize one or more of the network metrics in determining whether the threshold criteria has been met. For example, the UE 100 may use each individual network metric such that the threshold criteria is met so long as one of the measured network metric value satisfies its corresponding threshold value. In another example, the UE 100 may use the network metrics in combination such that the threshold criteria is met so long as any two or more of the measured network metric value satisfies its corresponding threshold value. In a further example, the UE 100 may use the network metrics in a specified combination such that pre-selected network metrics must have measured values that satisfy its corresponding threshold value.

If the UE 100 determines that the threshold criteria has not been met, the UE 100 continues the method 300 to 340. In 340, the UE 100 uses a first set of reference symbols. That is, the channel estimation application 135 may be provided the first set of reference symbols of the PDCCH information that was received for a current subframe. Thus, in 345, the channel estimation application 135 may determine the channel estimation based on the first set of reference symbols. Subsequently, the UE 100 returns the method 300 to 305.

If the UE 100 determines that the threshold criteria has been met, the UE 100 continues the method 300 to 350. In 350, the UE 100 uses a second set of reference symbols. Again, this second set of reference symbols may be used by the channel estimation application 135, as indicated in 345.

The first and second sets of reference symbols may relate to a number of reference symbols as provided in the subframe. As discussed above, the reference symbols may be included in OFDM symbols 0, 4 of the first slot and OFDM symbols 0, 4 of the second slot. If considered as a whole, the subframe may span fourteen OFDM symbols (e.g., from 0 to 13) such that the reference symbols are included in OFDM symbols 0, 4, 7, and 11. Therefore, the first and second sets of reference symbols may be a first X reference symbols and a first Y reference symbols in the subframe, respectively. According to the exemplary embodiments the first set uses a greater number than the second set. That is, the first set is a superset of the second set. For example, assuming two antenna ports such as the reference symbol structure 200, the second set may include only the reference symbol in OFDM symbol 0 of the first and second antenna ports. The first set being a superset may include reference symbols in OFDM symbols 0 and 4 of the first and second antenna ports. Alternatively, the first set may include reference symbols in all the OFDM symbols from 0 to 4 of the first and second antenna ports.

It should be noted that the use of two reference symbols in the first set and one reference symbol in the second set is only exemplary. Those skilled in the art will understand that any number of reference symbols may be used in the first and second sets so long as the first set remains a superset of the second set. It should also be noted that there may be at least one further third set that is a superset of the first set. As noted above, there may be an embodiment where all four symbols are used between OFDM symbol 0 and OFDM symbol 4. Therefore, there may be an additional threshold criteria that may be used. For example, the first threshold value for the SNR network metric may be 10 dB. A second threshold value for the SNR network metric may be 2 dB. Accordingly, when the measured SNR is greater than 10 dB, the second set may be used; when the measured SNR is between 2 dB and 10 dB, the first set may be used; and when the measured SNR is below 2 dB, the third set may be used.

The exemplary embodiments provide the first mechanism to determine channel estimation based upon a total number of reference symbols that are to be used in its calculation to increase a power conservation when predetermined criteria have been met. Specifically, when the criteria are met, the power management application 140 may select to use less reference symbols that increase a time when the receiver and the processor may be deactivated which results in the increased power conservation. For example, comparing the use of one reference symbol versus two reference symbols in a current subframe, a timeline saving of three symbols may be achieved. Thus, the associated power conservation through switching off the receiver paths for these three symbols may be achieved when there are no downlink grants detected in the PDCCH information. With properly selected threshold values for the network metrics, the performance impact may be negligible while achieving increased power conservation when no downlink grants are detected (which those skilled in the art will appreciate is a dominant scenario for lightweight data traffic applications). That is, the threshold criteria being met such as an acceptable SNR, an acceptable Doppler, an acceptable RSSI, etc. may individually or collectively be indicative of a quality connection with the LTE network such that the first mechanism may be used with the negligible impact on performance.

As discussed above, the exemplary embodiments may also provide a second mechanism for an adaptive channel estimation scheme to improve power conservation. In the second mechanism, the exemplary embodiments utilize a previously determined channel estimation to increase a deactivation time of the receiver and processor, thereby improving the power conservation. Those skilled in the art will understand that conventional approaches of power conservation in decoding the PDCCH have several drawbacks. For example, before decoding the PDCCH for a current subframe, a channel estimation needs to be performed based on received reference symbols in the current subframe. This process usually takes a sizeable processing time, during which the components cannot be switched to a lower-power sleep mode. Accordingly, there is only a limited time left in the current subframe for a sleep procedure to be used before an ensuing subframe comes with new PDCCH regions to be monitored. However, depending on certain network metrics, the channel response may not change much from subframe to subframe and the channel estimates from previous subframes may still be sufficient enough to demodulate and decode without an overhead of doing channel estimation for the current subframe. The second mechanism takes advantage of this aspect.

Figure 4:
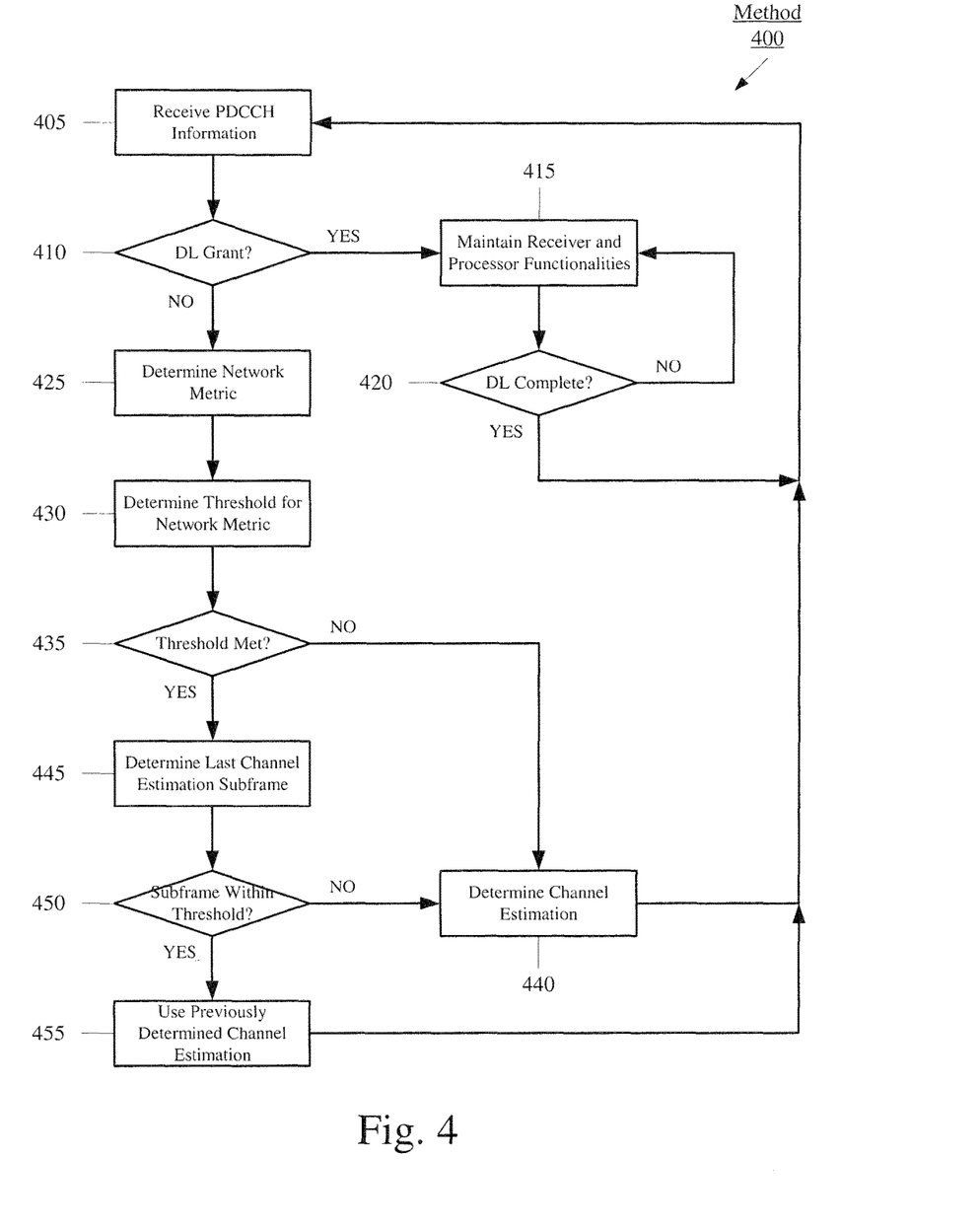
FIG. 4 shows a second exemplary method of an adaptive channel estimation scheme, according to some embodiments.

FIG. 4 shows a second exemplary method 400 of an adaptive channel estimation scheme using this second mechanism. It is again noted that, unless otherwise indicated, the method 400 may be performed through execution of the power management application 140. 405-435 of the method 400 may substantially correspond to 305-335 of the method 300. Thus, in 435, the UE 100 determines whether the threshold criteria has been met. The above analysis regarding the network metrics including their individual or group use may also be used with the method 400.

If the threshold criteria is not met, the UE 100 continues the method 400 to 440. In 440, the UE 100 determines the channel estimation for the current subframe. It should be noted that any channel estimation mechanism may be used in determining this calculation. For example, only the reference symbol in OFDM symbol 0 may be used; the reference symbols in OFDM symbols 0 and 4 may be used; etc. However, it should be noted that the mechanism used for the channel estimation may incorporate the method 300. That is, the method 400 may incorporate the method 300 such as when the threshold criteria is determined to be met, the analysis performed with the method 300 may also be performed to determine the channel estimation mechanism to be used.

Returning to 435, if the threshold criteria is met, the UE 100 continues the method 400 to 445. When the threshold criteria is met, the exemplary embodiments may utilize an adaptive channel estimation scheme, which includes a staggering channel estimation use. Specifically, a channel estimation that was determined in a previous subframe relative to a current subframe may be used for the current subframe. When the conditions indicate a quality connection with the LTE network, as discussed above, the channel response may not change much such that a previous channel estimation may be repeated for use. Again, the network metric threshold criteria may include at least one of a SNR, a Doppler estimation, a RSSI, a RSRP, a downlink BLER, etc.

In 445, the UE 100 determines a previous subframe in which the channel estimation was determined. For example, the channel estimation may have been determined in the immediately previous subframe, in the second subframe previous to the current subframe, in the fifth subframe previous to the current subframe, etc. In 450, the UE 100 determines whether the subframe for which the channel estimation was performed is within a predetermined threshold. For example, the channel estimation staggering use may allow for a previously determined channel estimation to be used for only one ensuing subframe. Thus, in the first example (immediately previous subframe), the subframe for which the channel estimation was performed is within the threshold. However, the second and third examples above (second subframe and fifth subframe, respectively) are not within the threshold. Other examples may include where the previous channel estimation may be used for at least three consecutive subframes in which case the first and second examples above are acceptable or may be used for at least five consecutive subframes in which case all three examples above are acceptable. Furthermore, in a substantially similar manner as discussed in the method 300, the method 400 may utilize more than one threshold criteria in step 435 to determine the number of subframes where a previously determined channel estimation may be used. That is, when conditions are determined to be optimal, the previously determined channel estimation may be used for more consecutive, subsequent subframes whereas a lower quality connection may allow for a smaller number of subsequent subframes to use the previously determined channel estimation.

If the subframe is not determined to be within the threshold, the UE 100 continues the method 400 to 440 where the channel estimation is determined. However, if the subframe is determined to be within the threshold, the UE 100 continues the method 400 to 455. In 455, the UE 100 utilizes the previously determined channel estimation. As such, the channel estimation application 135 may not be utilized for the current subframe.

The above mechanism for channel estimation and its application to the subframes may enable improved power conservation. Specifically, this second mechanism dynamically reuses the channel estimates from a previous subframe to save overhead of doing channel estimations in the current subframe. The saved overhead may include two aspects. A first aspect may be a need to receive enough reference symbols (e.g., one or two reference symbols) for channel estimation in the current subframe. A second aspect may be the hardware and firmware processing based on the received reference symbols in the current subframe. As discussed above, the PDCCH region to detect a downlink grant spans only up to the third OFDM symbol (i.e., from OFDM symbol 0 until OFDM symbol 2) that is shorter than the PDCCH region necessary to capture two reference symbols in the current frame (i.e., from OFDM symbol 0 to OFDM symbol 4). Accordingly, a repeat use of the channel estimation may substantially increase a time when the receiver and the processor are deactivated to increase power conservation.

Figure 5:
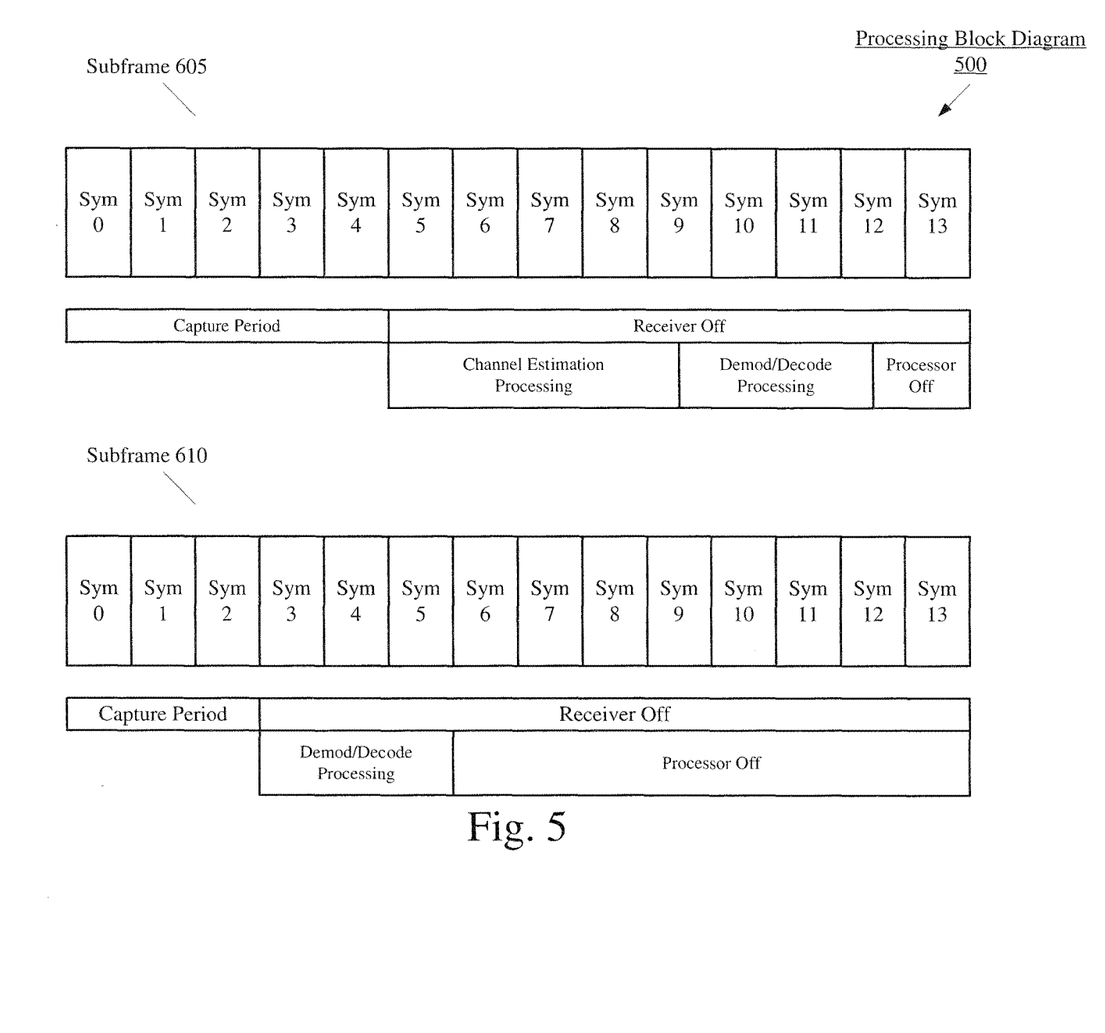
FIG. 5 shows an exemplary processing block diagram of the second exemplary method of FIG. 4, according to some embodiments.

FIG. 5 shows an exemplary processing block diagram 500 of the second exemplary method of FIG. 4. Specifically, the block diagram 500 illustrates how the second mechanism realizes the increased power conservation. As illustrated, a subframe 605 may be a current subframe whereas a subframe 610 may be a subsequent subframe. More specifically, the subframe 610 may be an immediately following subframe to subframe 605. It may be assumed that the subframe 605 is when channel estimation has been performed.

The capture period in which to detect for downlink grants and receive at least two reference symbols for the channel estimation in subframe 605 may span from OFDM symbol 0 to OFDM symbol 4. Despite the fact that the period for which the detection of a downlink grant in the PDCCH may be less than the illustrated capture period, the receiver is still required to be activated so that the second reference symbol may be received. Once the second reference symbol is received, the receiver may be deactivated from OFDM symbol 5 onward. The processor however remains activated such that the channel estimation processing may be performed (e.g., from OFDM symbol 5 to OFDM symbol 9) and the PDCCH demodulation and decoding processing may be performed (e.g., from OFDM symbol 9 to OFDM symbol 12). Once these processing procedures are completed, the processor may be allowed to be deactivated (e.g., from OFDM symbol 12 to the end of OFDM symbol 13 (i.e., the end of the subframe)). Accordingly, the power conservation realized for the subframe 605 may be from deactivating the receiver from OFDM symbol 5 until OFDM symbol 13 and deactivating the processor from OFDM symbol 12 until OFDM symbol 13.

When using a previously determined channel estimation, the capture period in which to detect for downlink grants need only be used. Thus, the capture period in subframe 610 may span from OFDM symbol 0 to OFDM symbol 2, e.g., the period for which there may be a downlink grant in the subframe. Subsequently, the receiver may be deactivated because the receiver does not need to detect any additional reference symbols for channel estimation. Since no channel estimation processing is necessary, the demodulation and decoding processing may be performed from OFDM symbol 3 until OFDM symbol 5. With no other processing required, the processor may be deactivated from OFDM symbol 6 and onward. Accordingly, the power conservation realized for the subframe 610 may be from deactivating the receiver from OFDM symbol 3 until OFDM symbol 13 and deactivating the processor from OFDM symbol 6 until OFDM symbol 13. Thus, through a comparison between subframe 605 and subframe 610, it is clear that subframe 610 has improved power conservation through both a deactivation of the receiver and the processor for a longer duration within the subframe.

The exemplary embodiments provide a device and method to adaptively perform channel estimation. Using at least one network metric as a basis, a user equipment having a quality connection with the network may utilize a different channel estimation scheme to improve a power conservation. According to a first mechanism, the user equipment may determine a number of reference symbols to use based upon the measured network metric satisfying a predetermined threshold value. According to a second mechanism, the user equipment may utilize a previously determined channel estimation for subsequent subframes based upon the measured network metric satisfying a predetermined threshold value.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform, MAC OS, iOS, Android OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a user equipment,
      receiving physical downlink control channel (PDCCH) information from a network, the PDCCH information being for a subframe including reference symbols at predetermined times therein;
      when the PDCCH information does not include a downlink grant for the user equipment in the subframe;
         determining a measured value of a network metric experienced by the user equipment;
         determining whether a threshold criteria is satisfied by the measured value relative to a threshold value of the network metric;
         when the measured value satisfies the threshold value, utilizing a first set of the reference symbols for a channel estimation; and
         when the measured value does not satisfy the threshold value, utilizing a second set of reference symbols for the channel estimation, wherein the first set of references symbols is a subset of the second set of the reference symbols.

2. The method of claim 1, wherein the network metric is at least one of a signal-to-noise ratio (SNR), a Doppler estimation, a received signal strength indication (RSSI), a reference symbol received power (RSRP), and downlink block error rate (BLER) statistics.

3. The method of claim 2, wherein, when the network metric is the SNR, the threshold criteria is satisfied when the measured value is greater than the threshold value.

4. The method of claim 3, wherein the threshold value of the SNR is between 5 and 10 dB.

5. The method of claim 2, wherein, when the network metric is the Doppler estimation, the threshold criteria is satisfied when the measured value is lower than the threshold value.

6. The method of claim 5, wherein the threshold value of the Doppler estimation is 70 Hz.

7. The method of claim 1, further comprising:
deactivating a receiver of the user equipment upon receiving the first set of reference symbols; and
deactivating a processor of the user equipment upon demodulating and decoding the first set of reference symbols.

8. The method of claim 1, wherein the first set of reference symbols includes a reference symbol inserted at an orthogonal frequency-division multiplexing (OFDM) symbol 0.

9. The method of claim 8, wherein the second set of reference symbols includes one of a reference symbol inserted at the OFDM symbol 0 and at an OFDM symbol 4 and all reference symbols inserted between the OFDM symbol 0 and the OFDM symbol 4, inclusive.

10. A method, comprising:
at a user equipment,
receiving physical downlink control channel (PDCCH) information from a network, the PDCCH information being for a first subframe including reference symbols at predetermined times therein;
determining a channel estimation based on the PDCCH information in the first subframe;
receiving PDCCH information for a second subframe;
when the PDCCH information of the second subframe does not include a downlink grant for the user equipment in the second subframe;
determining a measured value of a network metric experienced by the user equipment;
determining whether a threshold criteria is satisfied by the measured value relative to a threshold value of the network metric; and
utilizing the channel estimation from the first subframe when the measured value satisfies the threshold value.

11. The method of claim 10, wherein the network metric is at least one of a signal-to-noise ratio (SNR), a Doppler estimation, a received signal strength indication (RSSI), a reference symbol received power (RSRP), and downlink block error rate (BLER) statistics.

12. The method of claim 11, wherein, when the network metric is the SNR, the threshold criteria is satisfied when the measured value is greater than the threshold value.

13. The method of claim 12, wherein the threshold value of the SNR is between 5 and 10 dB.

14. The method of claim 11, wherein, when the network metric is the Doppler estimation, the threshold criteria is satisfied when the measured value is lower than the threshold value.

15. The method of claim 14, wherein the threshold value of the Doppler estimation is 70 Hz.

16. The method of claim 10, wherein the user equipment omits a channel estimation processing for the second subframe and deactivates a processor upon completing a demodulating and decoding of the PDCCH for the second subframe.

17. The method of claim 10, further comprising:
determining a number of consecutive subframes in which the channel estimation from the first subframe is used, wherein the channel estimation from the first subframe is utilized only when the second subframe is within the number of consecutive subframes of the first subframe.

18. The method of claim 17, further comprising:
determining a further channel estimation when the second subframe is beyond the number of consecutive subframes from the first subframe.

19. A user equipment, comprising:
a transceiver configured to establish a connection to an access network; and
a processor,
wherein the processor and transceiver are configured to perform a channel estimation by:
receiving physical downlink control channel (PDCCH) information from a network, the PDCCH information being for a subframe including reference symbols at predetermined times therein;
determining that the PDCCH information does not include a downlink grant for the user equipment in the subframe;
determining a measured value of a network metric experienced by the user equipment;
determining whether a threshold criteria is satisfied by the measured value relative to a threshold value of the network metric; and
utilizing a first set of the reference symbols for channel estimation when the measured value satisfies the threshold value that is a subset of a second set of the reference symbols used for channel estimation when the measured value does not satisfy the threshold value.

20. A user equipment, comprising:
a transceiver configured to establish a connection to an access network; and
a processor,
wherein the processor and transceiver are configured to perform a channel estimation by:
receiving physical downlink control channel (PDCCH) information from a network, the PDCCH information being for a first subframe including reference symbols at predetermined times therein;
determining a channel estimation based on the PDCCH information in the first subframe;
receiving PDCCH information for a second subframe;
determining that the PDCCH information of the second subframe does not include a downlink grant for the user equipment in the second subframe;
determining a measured value of a network metric experienced by the user equipment;
determining whether a threshold criteria is satisfied by the measured value relative to a threshold value of the network metric; and
utilizing the channel estimation from the first subframe when the measured value satisfies the threshold value.

* * * * *

UNITED STATES PATENT AND TRADEMARK OFFICE
CERTIFICATE OF CORRECTION

| | | |
|---|---|---|
| PATENT NO. | : 9,819,457 B2 | Page 1 of 1 |
| APPLICATION NO. | : 14/846002 | |
| DATED | : November 14, 2017 | |
| INVENTOR(S) | : Ji et al. | |

It is certified that error appears in the above-identified patent and that said Letters Patent is hereby corrected as shown below:

On the Title Page

Item (72), first inventor's name:
"Zu Ji" should read "Zhu Ji"

Signed and Sealed this
Twenty-eighth Day of May, 2019

Andrei Iancu
*Director of the United States Patent and Trademark Office*